Reissued Apr. 4, 1944

Re. 22,464

UNITED STATES PATENT OFFICE 22,464

LUBRICANT

Charles D. Kelso, Princeton, N. J., and Lawson W. Mixon, Hammond, Ind., assignors to Standard Oil Company, Chicago, Ill., a corporation of Indiana No Drawing. Original No. 2,316,090, dated April 6, 1943, Serial No. 424,967, December 30, 1941. Application for reissue February 1, 1944, Serial No. 520,706

31 Claims. (Cl. 252—48)

The present invention relates to improvements in lubricating oil addition agents and more particularly relates to non-corrosive mineral oil blends containing certain reaction products of the phosphorus sulfides and olefins or olefin polymers.

It has heretofore been discovered that certain reaction products of a phosphorus sulfide and an olefin or olefin polymer, when added to a mineral oil in small amounts are effective in inhibiting the formation of varnish, sludge, carbon and the like in lubricating oils and in general are effective in inhibiting corrosion to metal surfaces in contact with such oils. However, under certain conditions these reaction products, particularly the neutralized reaction products, do not inhibit corrosion to the desired degree, and in some cases may induce corrosion.

We have discovered that lubricant compositions containing these neutralized reaction products of a phosphorus sulfide and an olefin can be made substantially non-corrosive by adding in combination with the latter a small amount of elemental sulfur or an organic sulfur compound, particularly an organic sulfur compound capable of being decomposed to give free sulfur at the temperature to which the lubricant is subjected during use. Examples of suitable organic sulfur compounds are sulfurized mineral oils, sulfurized non-drying animal and vegetable oils such as sulfurized lard oil, sulfurized corn oil and the like, sulfurized olefins, sulfurized olefin polymers, such as sulfurized isobutylene polymer, sulfurized sperm oil, etc.

The preferred olefins suitable for the preparation of the hereindescribed phosphorus sulfide reaction products are olefins having at least 20 carbon atoms in the molecule, of which from about 12 carbon atoms to about 18 carbon atoms, and preferably at least 15 carbon atoms, may be in a long chain. Such olefins can be obtained by the dehydrogenation of paraffins, such as by the cracking of paraffin waxes, or by the dehalogenation of alkyl halides, preferably long chain alkyl halides, particularly halogenated paraffin waxes.

The olefins obtained by dehalogenation of long chain alkyl halides are preferably those obtained by dehalogenation of monohalogenated waxes, such as, for example, those obtained by dechlorination of monochlor paraffin wax. The alkyl halides are decomposed to yield olefins according to the reaction $$C_nH_{2n+1}X \rightarrow C_nH_{2n} + HX$$

in which $n$ is a whole number, preferably 20 or more, and X is an halogen. We prefer to employ paraffin waxes having at least about 20 carbon atoms per molecule, and melting points upwards from about 90° F. and preferably within the range of from about 120° F. to about 140° F.

To obtain the halogenated paraffin wax, for example, chlorinated paraffin wax, we introduce chlorine into the wax, maintained in a molten state, until the wax has a chlorine content of from about 8% to about 15%. The chlorinated wax product is a mixture of unchlorinated wax, monochlor wax and polychlor wax. This chlorinated product may be used as such, but it is advantageous to use the substantially monochlor wax fraction. The monochlor wax fraction can be segregated from the unchlorinated wax and the polychlor wax fractions by taking advantage of the differences in the melting points of the various fractions, since the melting point of the unchlorinated wax is greater than that of the monochlor wax, and the melting point of the latter is greater than that of the polychlor wax. Thus, the monochlor paraffin wax can be separated from the unchlorinated and the polychlor wax fractions by means such as sweating, fractional distillation, solvent extraction, solvent precipitation, and fractional crystallization.

The high molecular weight olefins are obtained by removing the halogen as hydrogen halide from the halogenated paraffin wax. For example, the corresponding olefin is obtained from the monochlor paraffin wax by removing the chlorine from the latter as hydrogen chloride. The monochlor wax can be dechlorinated by heating to a temperature of from about 200° F. to about 600° F. in the presence of a dechlorinating agent such as an alkali metal hydroxide or an alkaline earth metal hydroxide or oxide. Other alkaline inorganic or organic materials can also be used. The chlorine can also be removed from the chlorowax by heating the same for a prolonged period in the absence of any dechlorinating agent. After the dehalogenation has been completed the olefin so obtained can be further purified by removing the dehalogenating agent by means of filtration or by other suitable means.

We may also employ olefin polymers, preferably those having molecular weights above about 300. As olefinic starting materials for the production of such polymers, we may employ the individual olefins themselves, mixtures of olefins or mixtures of olefins and non-olefinic compounds. For example, the olefinic starting material may be butylenes, amylenes, refinery gases containing normally gaseous olefins and cracked distillates or other relatively low-boiling hydrocarbon mixtures containing normally liquid olefins and mixtures of normally liquid olefins, containing substantial amounts of dissolved normally gaseous olefins.

The polymers referred to above may be those obtained by polymerizing olefinic hydrocarbons in the presence of catalyst such as sulfuric acid, phosphoric acid, or aluminum chloride, zinc chloride, boron fluoride and other catalysts of the Friedel-Crafts type. For example, we may employ the polymers resulting from the treatment of mono-olefins, preferably iso-mono-olefins, such as isobutylene and isoamylene and/or the copolymers obtained by the polymerization of hydrocarbon mixtures containing low molecular weight iso-olefins and normal olefins, preferably those of less than six carbon atoms.

The mono-olefin polymer to be treated may be the polymer resulting from the polymerization of low molecular weight iso-mono-olefins such as isobutylene and isoamylene and/or the copolymers obtained by the polymerization of hydrocarbon mixtures containing low molecular weight iso-mono-olefins and normal mono-olefins such as those of less than six carbon atoms, and preferably those of four carbon atoms. The polymer may be obtained by the polymerization of these mono-olefins or mixed mono-olefins in the presence of a catalyst such as sulfuric acid, phosphoric acid, boron fluoride, aluminum chloride or other similar halide catalyst of the Friedel-Crafts type.

The polymers employed are preferably mono-olefin polymers, in which the molecular weight ranges from about 150 to about 50,000 or more, and preferably from about 500 to about 10,000. These polymers can be obtained, for example, by the polymerization in the liquid phase of iso-olefins such as isobutylene or hydrocarbon mixtures containing the same at a temperature of from about −80° F. to about 100° F., in the presence of a catalyst such as boron fluoride. In the preparation of these polymers, we employ, for example, liquid isobutylene or a hydrocarbon mixture containing isobutylene, butane, and butylene, recovered from petroleum gases, especially those gases produced in the cracking of petroleum oils in the manufacture of gasoline. This light fraction may contain from about 10% to about 25% isobutylene, the remainder being principally butanes and normal butylene.

We may also employ as the starting material the polymer obtained by polymerizing unsaturated hydrocarbons resulting from the vapor phase cracking of paraffin waxes in the presence of aluminum chloride which is fully described in United States Patents Nos. 1,995,260, 1,970,002 and 2,091,398. Still another type of olefin polymer which may be employed is the polymer resulting from the treatment of vapor phase cracked gasoline and/or gasoline fractions with sulfuric acid or solid absorbents such as fuller's earth whereby unsaturated polymerized hydrocarbons are removed. Also contemplated within the scope of our invention is the treatment with phosphorus sulfide of the polymers resulting from the voltolization of hydrocarbons as described, for example, in United States Patents Nos. 2,197,768 and 2,191,787.

Other olefins which can be employed are the high molecular weight copolymers of a low molecular weight olefin and a non-aromatic hydrocarbon having the general formula $C_nH_{2n-x}$ in which $x$ is 2 or a multiple of 2, the copolymer having a controlled degree of unsaturation. It is to be understood that the expression "non-aromatic hydrocarbon having the general formula $C_nH_{2n-x}$ in which $x$ is 2 or a multiple of 2" embraces the substitution products of these hydrocarbons, such as, for example, chloroprene. By reacting a phosphorus sulfide with the copolymer, having the desired degree of unsaturation, reaction products are obtained which have a higher phosphorus content than is otherwise obtainable by reacting a phosphorus sulfide with a mono-olefin polymer, and which are more stable than the reaction products of a phosphorus sulfide and a diolefin polymer.

The copolymer base is prepared by controlled copolymerization of a low molecular weight olefin and a non-aromatic hydrocarbon of the above type in the presence of a catalyst of the Friedel-Crafts type. The low molecular weight olefin is preferably an isoolefin or a tertiary base olefin preferably one having less than 7 carbon atoms per molecule. Examples of olefins which can be suitably employed are isobutylene, 2-methylbutene-1, 2-ethylbutene-1, secondary and tertiary base amylene, hexylenes and the like, isobutylene being preferred, however.

Examples of the non-aromatic hydrocarbons falling within the above general formula are the conjugated diolefins such as butadiene, isoprene, cyclopentadiene, 2,3-dimethylbutadiene-1,3, pentadiene-1,3, hexadiene-2,4, and the substituted diolefins such as chloroprene and the like, the diolefins such as dialkyls, for example, diisobutenyl, and the like, in which the double bond is not conjugated; and the acetylenes such as acetylene, vinyl acetylene and the like; and the substitution products of the foregoing.

The copolymerization of the isoolefin and the diolefin is preferably carried out in the presence of aluminum chloride or boron fluoride, although other Friedel-Crafts type catalyst such as aluminum bromide, zinc chloride, zirconium chloride and the like can be employed.

In the preparation of the copolymer base which preferably has a molecular weight of from about 1,000 to about 30,000 and contains from about 2% to about 20% butadiene, from about 20% to about 60% by weight of the diolefin is reacted with the olefin at a low temperature ranging from about 32° F. to about −150° F. and preferably from about 10° F. to about −130° F. The polymerization is conducted in the presence of a diluent and preferably a diluent which is capable of functioning also as a refrigerant such as a liquefied normally gaseous hydrocarbon such as, for example, liquefied ethylene, liquefied propane, liquefied butane and the like. Alkyl halides such as methyl chloride can also be used.

In carrying out the polymerization the reaction chamber is first cooled to the desired low temperature by adding thereto a sufficient amount of the liquefied normally gaseous hydrocarbon. The diolefins are then added to the reactor followed by the addition of the isoolefin. After the isoolefin has been added the catalyst, preferably in solution in a suitable solvent such as, for example, a low molecular weight alkyl halide, is then added to the mixture. It is highly desirable to provide for rapid mixing of the reaction mass to obtain a uniform product. The polymerization reaction is permitted to proceed to a polymer yield of from about 50% to about 90% in order to obtain polymers of the desired molecular weight and of the desired degree of unsaturation. The reaction can be stopped at the desired yield by adding to the reactor a material capable of quenching the reaction. Suitable quenching agents are alcohols, ethers, ketones and the like; ethyl alcohol is preferably employed for this purpose.

The neutralized phosphorus sulfide-olefin reaction product is prepared by first reacting an olefin of the foregoing type with a phosphorus sulfide such as $P_2S_3$, $P_2S_5$, $P_4S_3$, $P_4S_7$, or other phosphorus sulfides and preferably phosphorus pentasulfide, $P_2S_5$. The phosphorus sulfide-olefin reaction product may be readily obtained by reacting the phosphorus sulfide, for example, $P_2S_5$, with the olefin at a temperature of from about 200° F. to about 500° F. and preferably from about 200° F. to about 400° F., the phosphorus sulfide being used in quantities amounting from about 1% to about 50% and preferably from about 5% to about 25% (by weight) of the reactants employed. It is advantageous to maintain a non-oxidizing atmosphere, such as, for example, an atmosphere of nitrogen, above the reaction mixtures. Usually it is preferable to use an amount of the phosphorus sulfide that will completely react with the olefin so that no further purification becomes necessary. However, excess phosphorus sulfide may be used and separated from the product after heating is discontinued by filtering or by diluting with a solvent such as hexane, filtering, and subsequently distilling off the solvent. If desired, the reaction product may be further treated by blowing with steam at an elevated temperature of from about 200° F. to about 600° F. to improve the odor thereof.

The phosphorus sulfide-olefin reaction product normally shows a titratable acidity. This titratable acidity is neutralized when the reaction product is treated with a basic reagent. The phosphorus sulfide-olefin reaction product when neutralized with a basic reagent containing a metal constituent is characterized by the presence or retention of the metal constituent of the reagent. Other metal constituents such as a heavy metal constituent may be introduced into the neutralized product by reacting the same with a salt of the desired heavy metal.

The term "neutralized phosphorus sulfide-olefin reaction product" as used herein means a phosphorus sulfide-olefin reaction product having at least about 1% of its titratable acidity reduced by the reaction with a basic reagent, and includes the neutralized phosphorus sulfide-olefin reaction products containing a metal constituent resulting from said neutralization or resulting from the reaction of a heavy metal salt with the phosphorus sulfide-olefin reaction product with a basic reagent.

The neutralized phosphorus sulfide-olefin reaction product may be obtained by adding to the reaction product a suitable basic compound such as a hydroxide, carbonate, or an oxide of an alkaline earth metal or of an alkali metal, preferably potassium hydroxide or sodium hydroxide. Other basic reagents may be used, such as, for example, ammonia, or alkyl or aryl substituted ammonia, such as amines. As aforesaid, when the phosphorus sulfide-olefin reaction product is neutralized with a basic compound containing a metal constituent the neutralized reaction product is characterized by the presence of the metal constituent of such basic reagent. Neutralized reaction products containing a heavy metal constituent such as, for example, tin, titanium, aluminum, chromium, cobalt, iron and the like may be obtained by reacting a salt of the desired heavy metal with the phosphorus sulfide-olefin reaction product which has been treated with a basic reagent.

It will be understood that when the neutralization is accomplished with a polyvalent basic material, such as lime, a product having excess basicity may be obtained.

In accordance with the present invention the foregoing neutralized reaction products are employed in lubricants in small amounts in combination with small amounts of the aforementioned organic sulfur-bearing compounds or sulfur. The neutralized phosphorus sulfide-olefin or olefin polymer reaction product is employed in amounts within the range of from about 0.001% to about 10% and preferably from about 0.01% to about 3%, while the organic sulfur-bearing compound or sulfur is employed in amounts sufficient to give a free sulfur content within the range of from about 0.001% to about 5%, preferably from about 0.002% to about 3%.

The improvement obtained when a small amount of a sulfur-bearing organic compound or sulfur is used in combination with a neutralized phosphorus sulfide-olefin or olefin reaction product is illustrated by the corrosion data presented in the following table. The data presented therein are those obtained by immersing a copper strip having an area of about 6.5 square centimeters and a lead strip having an area of about 3.5 square centimeters in 380 cc. of oil maintained at a temperature of 315° F. the test piece being suspended on a glass rod which is rotated at 100 R. P. M. At intervals of 24, 48 and 72 hours the lead test pieces are removed, cleaned, dried and the loss in weight in milligrams noted. The following oils were tested by the above method:

A. A SAE 20 motor oil plus 0.75% neutralized phosphorus sulfide-isobutylene polymer ($AlCl_3$ polymerized) reaction product.
B. A+0.25% sulfurized mineral oil containing about 1.5% free sulfur.
C. A+1% sulfurized mineral oil containing about 1.5% free sulfur.
D. A+3% sulfurized mineral oil containing about 1.5% free sulfur.
E. A SAE 20 motor oil plus 2% neutralized phosphorus sulfide-isobutylene polymer ($BF_3$ polymerized) reaction product.
F. E+0.1% sulfurized mineral oil containing about 1.5% free sulfur.
G. E+0.25% sulfurized mineral oil containing about 1.5% free sulfur.
H. E+1% sulfurized mineral oil containing about 1.5% free sulfur.

*Table I*

| Oil | Lead corrosion—loss in milligrams | | |
|---|---|---|---|
| | 24 hrs. | 48 hrs. | 72 hrs. |
| A | 26.0 | | |
| B | 1.7 | 32.5 | 95.8 |
| C | 0.1 | 1.8 | 24.9 |
| D | 1.0 | 9.3 | 37.3 |
| E | 10.3 | 72.5 | |
| F | 0.8 | 2.6 | 41.7 |
| G | 1.1 | 3.1 | 61.1 |
| H | 0.4 | 7.2 | 56.2 |

The above data show decrease in corrosion affected by the use of a specific organic sulfur compound, employed in combination with a neutralized olefin polymer-phosphorus sulfide reaction product in mineral oil. The improvement obtained and the degree of improvement effected may vary to some extent with the type of sulfur-bearing compound employed, although they all exhibit a definite improvement.

Although we have described our invention as applied to mineral lubricating oils, our invention contemplates the use of sulfur-bearing organic compounds of the type described or elemental sulfur in combination with the neutralized reaction products of a phosphorus sulfide and an olefin or olefin polymer, in products other than the mineral lubricating oils such as, for example, fuel oils, insulating oils, non-drying vegetable and animal oils, synthetic oils, greases and the like.

The term "olefin" as used in the phrase "phosphorus sulfide-olefin reaction product" as applied herein and in the appended claims includes olefins, olefin polymers and olefin copolymers.

While we have described our invention by reference to various representative constituents and have illustrated the same by reference to specific examples thereof, our invention is not to be limited to the various representative compounds named or to the specific examples given but includes within its scope such modifications as come within the spirit of the appended claims.

We claim:

1. A lubricant composition containing an oil and a small amount of a sulfur compound selected from the class consisting of elemental sulfur and an organic sulfur compound capable of decomposing to form free sulfur, and a small amount of the neutralized phosphorus and sulfur-containing reaction product of a phosphorus sulfide and an olefin.

2. A lubricant composition containing an oil and a small amount of a sulfur compound selected from the class consisting of an organic sulfur compound and elemental sulfur, and a small amount of the neutralized phosphorus and sulfur-containing reaction product of a phosphorus sulfide and an olefin having at least 20 carbon atoms in a molecule of which from about 12 carbon atoms to about 18 carbon atoms are in a long chain.

3. A lubricant composition containing an oil and a small amount of a sulfur compound selected from the class consisting of an organic sulfur compound and elemental sulfur, and a small amount of the neutralized phosphorus and sulfur-containing reaction product of a phosphorus sulfide and an olefin polymer having a molecular weight of at least about 300.

4. A lubricant composition containing an oil and a small amount of a sulfur compound selected from the class consisting of an organic sulfur compound and elemental sulfur, and a small amount of the neutralized phosphorus and sulfur-containing reaction product of a phosphorus sulfide and an isobutylene polymer having a molecular weight of at least about 300.

5. A lubricant composition containing an oil and a small amount of a sulfur compound selected from the class consisting of an organic sulfur compound and elemental sulfur, and a small amount of the neutralized phosphorus and sulfur-containing reaction product of a phosphorus sulfide and a copolymer of a mono-olefin and a non-aromatic hydrocarbon having the general formula $C_nH_{2n-x}$ in which x is 2 or a multiple of 2.

6. A lubricant composition containing an oil and a small amount of an organic sulfur compound capable of decomposing to form free sulfur and a small amount of the neutralized phosphorus and sulfur-containing reaction product of phosphorus pentasulfide and an isobutylene polymer having a molecular weight of at least about 300.

7. A lubricant composition as described in claim 6 in which the neutralized reaction product contains a metal constituent.

8. A lubricant as described in claim 6 in which the neutralized reaction product contains potassium.

9. A lubricant as described in claim 6 in which the neutralized reaction product contains sodium.

10. A lubricant as described in claim 6 in which the neutralized reaction product contains calcium.

11. A lubricant composition containing an oil and at least about 0.001% of a sulfurized mineral oil and at least about 0.001% of the neutralized phosphorus and sulfur-containing reaction product of phosphorus pentasulfide and an isobutylene polymer having a molecular weight of at least about 300, said neutralized reaction product containing potassium.

12. A lubricant comprising a mineral oil and in combination therewith a small amount of an organic sulfur compound capable of decomposing to form free sulfur and a small amount of the neutralized phosphorus and sulfur-containing reaction product of a phosphorus sulfide and an olefin.

13. A lubricant comprising a mineral oil, a small amount of an organic sulfur compound capable of forming free sulfur upon decomposition and a small amount of the neutralized phosphorus and sulfur-containing reaction product of a phosphorus sulfide and an isobutylene polymer having a molecular weight of at least about 300.

14. A lubricant as described in claim 13 in which the organic sulfur compound is a sulfurized mineral oil.

15. A lubricant composition containing a mineral oil, a small amount of an organic sulfur compound capable of decomposing to form free sulfur and a small amount of the neutralized phosphorus and sulfur-containing reaction product of a phosphorus sulfide and an olefin having at least 20 carbon atoms in a molecule of which from about 12 carbon atoms to about 18 carbon atoms are in a long chain.

16. A lubricant comprising a mineral oil, a small amount of an organic sulfur compound capable of forming free sulfur upon decomposition and a small amount of the neutralized phosphorus and sulfur-containing reaction product of a phosphorus sulfide and a copolymer of a monoolefin and a non-aromatic hydrocarbon having the general formula $C_nH_{2n-x}$ in which $x$ is 2 or a multiple of 2.

17. A lubricant as described in claim 16 in which the mono-olefin is isobutylene and the non-aromatic hydrocarbon having the general formula $C_nH_{2n-x}$ is butadiene.

18. a lubricant comprising a mineral oil, a small amount of an organic sulfur compound and a small amount of the neutralized phosphorus and sulfur-containing reaction product of a phosphorus sulfide and a copolymer of isobutylene and chloroprene, said copolymer having a molecular weight of at least about 1,000.

19. A lubricant comprising a mineral lubricating oil, a small amount of a sulfurized oil and a small amount of the neutralized phosphorus and sulfur-containing reaction product of a phosphorus sulfide and an olefin polymer having a molecular weight of at least about 3,000.

20. A lubricant comprising a mineral lubricating oil, a sulfurized mineral oil having a free sulfur content of at least about 0.001% and at least about 0.001% of the neutralized phosphorus and sulfur-containing reaction product of a phosphorus sulfide and an isobutylene polymer having a molecular weight of at least about 1,000.

21. A lubricant as described in claim 20 in which the neutralized reaction product contains a metal constituent.

22. A lubricant as described in claim 20 in which the neutralized reaction product contains potassium.

23. A lubricant as described in claim 20 in which the neutralized reaction product contains sodium.

24. A lubricant as described in claim 20 in which the neutralized reaction product contains calcium.

25. The method of inhibiting corrosion and the formation of deposits of the type of sludge, carbon and varnish in an internal combustion engine during use comprising lubricating with an oil normally susceptible to form sludge, carbon and varnish in an internal combustion engine during use and in combination therewith small amounts of an organic sulfur compound capable of forming free sulfur upon decomposition and the phosphorus and sulfur-containing product obtained by the process comprising reacting a phosphorus sulfide with an olefin and neutralizing said product with a basic reagent, said organic sulfur compound being used in amounts sufficient to inhibit corrosion and said neutralized reaction product being used in amounts sufficient to inhibit the formation of deposits of the type of sludge, carbon and varnish.

26. A new composition of matter comprising: an oil; a sulfur compound selected from the class consisting of elemental sulfur and an organic sulfur compound; and, the neutralized phosphorus and sulfur-containing reaction product of a phosphorus sulfide and an olefin.

27. A new composition of matter as described in claim 26 in which the neutralized reaction product contains a metal constituent.

28. A new composition of matter as described in claim 26 in which the neutralized reaction product contains potassium.

29. A new composition of matter as described in claim 26 in which the neutralized reaction product contains sodium.

30. A new composition of matter as described in claim 26 in which the neutralized reaction product contains calcium.

31. A new composition of matter comprising: an oil; a sulfur compound selected from the class consisting of elemental sulfur and an organic sulfur compound; and, a neutralized pnosphorus and sulfur-containing reaction product of a phosphorus sulfide and a mono-olefin polymer.

CHARLES D. KELSO.
LAWSON W. MIXON.